US012576679B1

(12) United States Patent (10) Patent No.: US 12,576,679 B1
Ferez (45) Date of Patent: Mar. 17, 2026

(54) MULTIPLE-SEAT WAGON PROPELLED BY SIMULTANEOUSLY ROWING AND PEDALING FOR USE IN WATER OR LAND

(71) Applicant: Marcio Cesar Ferez, Miami, FL (US)

(72) Inventor: Marcio Cesar Ferez, Miami, FL (US)

( * ) Notice: Subject to any disclaimer, the term of this patent is extended or adjusted under 35 U.S.C. 154(b) by 0 days.

(21) Appl. No.: 18/445,580

(22) Filed: Oct. 31, 2023

(51) Int. Cl.
B60F 3/00 (2006.01)
(52) U.S. Cl.
CPC ................................. B60F 3/0084 (2013.01)
(58) Field of Classification Search
CPC .......... B60F 3/00; B60F 3/003; B60F 3/0038; B60F 3/0061; B60F 3/0069; B60F 3/007; B60F 3/0084; B60F 5/00
USPC ........... 440/12.5, 12.51, 12.55, 12.62, 12.66, 440/12.68, 13, 21, 26, 27, 29, 30, 31, 32
See application file for complete search history.

(56) References Cited

U.S. PATENT DOCUMENTS

| | | | |
|---|---|---|---|
| 5,816,598 A | 10/1998 | Dodakian | |
| 8,328,213 B1 | 12/2012 | Crawford | |
| 9,403,585 B2 * | 8/2016 | Arad | B63H 16/20 |
| 9,738,129 B2 * | 8/2017 | Dovel | B63H 16/12 |
| 10,752,317 B1 | 8/2020 | Jones | |
| 11,498,651 B2 * | 11/2022 | Rhyne | B63B 29/04 |

* cited by examiner

*Primary Examiner* — Daniel V Venne
(74) *Attorney, Agent, or Firm* — Mark Terry

(57) ABSTRACT

The present invention provides a novel multiple-seat wagon propelled by simultaneously rowing and pedaling for use in water or land. The present invention provides a unique and versatile multiple-seat wagon that can be converted into a sea vessel. It allows the vehicle to float on water and serves as the lower part of the vessel. The water propulsion assembly includes two water wheels that are responsible for generating forward and backward motion when the vehicle is in water. It also has a water shaft that holds the water wheels. The pinion gear increases the rotational speed of the water wheels, enhancing the efficiency of propulsion from a pedaling motion and a rowing motion. The invention features a demountable coupling system that allows for disassembly and reassembly while maintaining the interconnection of its components.

2 Claims, 15 Drawing Sheets

1400

MULTIPLE-SEAT WAGON PROPELLED BY SIMULTANEOUSLY ROWING AND PEDALING FOR USE IN WATER OR LAND

CROSS-REFERENCE TO RELATED APPLICATION

Not applicable.

FIELD OF THE INVENTION

The present invention provides a novel multiple-seat wagon propelled by simultaneously rowing and pedaling for use in water or land. More specifically, the present invention provides a first rowing and pedaling body assembly that couples to a second water buoyant assembly.

BACKGROUND OF THE INVENTION

In the ever-evolving landscape of transportation and recreational vehicles, there has long been a quest for innovative and versatile modes of locomotion. Historically, various forms of human-powered transportation have been developed to cater to the diverse needs of both urban and outdoor enthusiasts. However, there has remained a persistent desire for a truly multifunctional vehicle capable of seamlessly transitioning between different terrains, such as water and land, while providing efficient and engaging human-powered propulsion.

To address these demands and challenges, the present invention introduces a groundbreaking concept: the multiple-seat wagon propelled by simultaneously rowing and pedaling for use in water or land. This invention represents a convergence of cutting-edge engineering and a visionary approach to personal transportation and recreation.

The idea for this invention was conceived against the backdrop of an increasingly eco-conscious society, where sustainable modes of transportation are not just desirable but imperative. It also emerged from a recognition of the need for multi-purpose vehicles that can adapt to diverse environments, thereby expanding the horizons of adventure and exploration for people of all ages.

The core innovation of this invention lies in its unique combination of a first rowing and pedaling body assembly with a second water-buoyant assembly. This seamless integration allows users to transition effortlessly between propelling the vehicle through water and maneuvering it on land. The rowing and pedaling mechanism harnesses human power efficiently, ensuring a harmonious blend of exercise and enjoyment while minimizing environmental impact.

The water buoyant assembly ensures stability and buoyancy on aquatic surfaces, making it suitable for use on lakes, rivers, and other water bodies. Meanwhile, the robust design of the land-based components enables easy navigation on trails, roads, and various terrains, offering a truly all-terrain experience.

Furthermore, the multiple-seat configuration of this wagon fosters a sense of community and togetherness, enabling users to share the joy of exploration with friends and family. It encourages social interaction and bonding while promoting physical activity and outdoor engagement.

The multiple-Seat Wagon Propelled by Simultaneously Rowing and Pedaling for Use in Water or Land represents a visionary leap forward in the realm of sustainable and versatile personal transportation and recreation. Its innovative design and multifunctional capabilities are poised to redefine the way people experience the great outdoors, all while preserving our natural environment. This invention embodies the spirit of adventure, environmental consciousness, and a commitment to fostering connections among individuals in a rapidly evolving world.

The multiple-Seat Wagon Propelled by Simultaneously Rowing and Pedaling for Use in Water or Land offers a range of health benefits associated with regular exercise. This innovative mode of transportation and recreation encourages users to engage in physical activity while enjoying the great outdoors. Here are some of the notable health benefits:

Cardiovascular Fitness: The simultaneous rowing and pedaling action provides an excellent cardiovascular workout. It elevates the heart rate, improving the efficiency of the cardiovascular system. Regular use can contribute to enhanced endurance and overall cardiovascular health.

Muscle Strength: Rowing and pedaling engage multiple muscle groups throughout the body, including the legs, core, back, and arms. This full-body workout helps build and tone muscles, leading to increased strength and endurance.

Weight Management: Consistent use of the multiple-seat wagon can help individuals burn calories and manage their weight effectively. It provides an enjoyable and engaging way to incorporate physical activity into one's routine.

Some cancers. Being physically active reduces your risk of developing several of the most common cancers. Research shows that people who engage in higher levels of physical activity have a lower risk of developing the following types of cancer: Bladder, Breast, Colon (proximal and distal), Endometrium, Esophagus (adenocarcinoma), Kidney, and Lung, Stomach (cardia and non-cardia adenocarcinoma).

Joint Health: The low-impact nature of rowing and pedaling reduces stress on the joints compared to high-impact activities like running. This makes it an ideal exercise option for individuals with joint issues or those looking to protect their joint health.

Improved Flexibility: The rhythmic motion of rowing and pedaling encourages flexibility in the joints and muscles. Over time, users may experience increased range of motion and reduced risk of injury.

Balance and Coordination: Maneuvering the multiple-seat wagon on different terrains requires balance and coordination. Regular use can enhance these skills, which are essential for overall physical function and stability.

Stress Reduction: Outdoor activities and exposure to nature have been shown to reduce stress and improve mental well-being. The combination of exercise and the calming effect of being on the water or in natural settings can contribute to reduced stress levels.

Social Interaction: The multiple-seat configuration of the wagon promotes social interaction and bonding. Engaging in physical activity with friends and family can enhance mental and emotional health by fostering connections and positive social experiences.

Variety and Enjoyment: The versatility of the invention, allowing users to transition between water and land, adds an element of variety and novelty to exercise routines. This can help individuals stay motivated and committed to regular physical activity.

Environmental Awareness: By using human-powered propulsion, the invention encourages eco-friendly transportation, reducing reliance on fossil fuels and contributing to a cleaner environment. Promoting environmental consciousness can positively impact mental well-being and a sense of purpose.

In summary, the multiple-Seat Wagon Propelled by Simultaneously Rowing and Pedaling for Use in Water or Land not only offers a unique and enjoyable mode of transportation but also promotes physical fitness, mental well-being, and a strong connection to the natural world. Its health benefits make it a valuable tool for individuals looking to improve their overall fitness and lead a more active and balanced lifestyle.

Therefore, a need exists to overcome the problems with the prior art as discussed above.

SUMMARY OF THE INVENTION

The invention provides a novel convertible vehicle multiple-seat wagon propelled by either rowing or pedaling for use in water or land that overcomes the heretofore mentioned disadvantages of the heretofore-known devices and methods of this general type.

With the foregoing and other objects in view, there is provided, in accordance with the invention, a multiple-seat wagon propelled by simultaneously rowing and pedaling for use in water or land comprising a first rowing and pedaling body assembly defining a first chassis assembly at an upper portion, further defining a first set of apertures and a plurality of interlocking grooves; and a floating assembly defining a second chassis assembly at a lower portion, further defining a second set of apertures and a plurality of interlocking grooves sized to mate the first chassis assembly.

In accordance with another feature, an embodiment of the present invention includes a first rowing and pedaling body assembly is used to propel a multiple-seat wagon on land and water.

In accordance with a further feature of the present invention, the first chassis assembly at an upper portion demountable couples with the second chassis assembly at a lower portion.

In accordance with a further feature of the present invention, the first chassis assembly at an upper portion demountable couples with the second chassis assembly at a lower portion by a plurality of protrusions.

In accordance with another feature, an embodiment of the present invention also includes a pair of floating buoys demountable couples with the second chassis assembly at a lower portion.

In accordance with yet another feature, an embodiment of the present invention includes A multiple-seat wagon propelled by simultaneously rowing and pedaling for use in water or land comprising: a first rowing and pedaling body assembly that couples to a second water buoyant assembly further comprising: a first set of apertures and a plurality of interlocking grooves; and a second set of apertures and a plurality of interlocking grooves sized to mate the first chassis assembly.

In accordance with further features of the present invention, the multiple-seat wagon further comprises the following: a first rowing and pedaling body assembly used to propel a multiple-seat wagon on land and water; a first chassis assembly at an upper portion demountable coupled with a second chassis assembly at a lower portion; wherein the first chassis assembly at an upper portion demountable couples with the second chassis assembly at a lower portion by a plurality of protrusion; and, further comprising, a pair of floating buoys demountable couples with the second chassis assembly at a lower portion.

Although the invention is illustrated and described as embodied in a MULTIPLE-SEAT WAGON PROPELLED BY SIMULTANEOUSLY ROWING AND PEDALING FOR USE IN WATER OR LAND, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

As used in the specification and in the claims the term "demountable coupled" shall refer to be able to be removed on and off without much effort many times; as a non-limiting example, it may include de use of multiple types of mechanical couplings, magnetic coupling, locks, glues, and many more.

BRIEF DESCRIPTION OF THE DRAWINGS

The accompanying figures, where like reference numerals refer to identical or functionally similar elements throughout the separate views and which, together with the detailed description below are incorporated in and form part of the specification, serve to further illustrate various embodiments and explain various principles and advantages all in accordance with the present invention.

DETAILED DESCRIPTION

Figure 1:
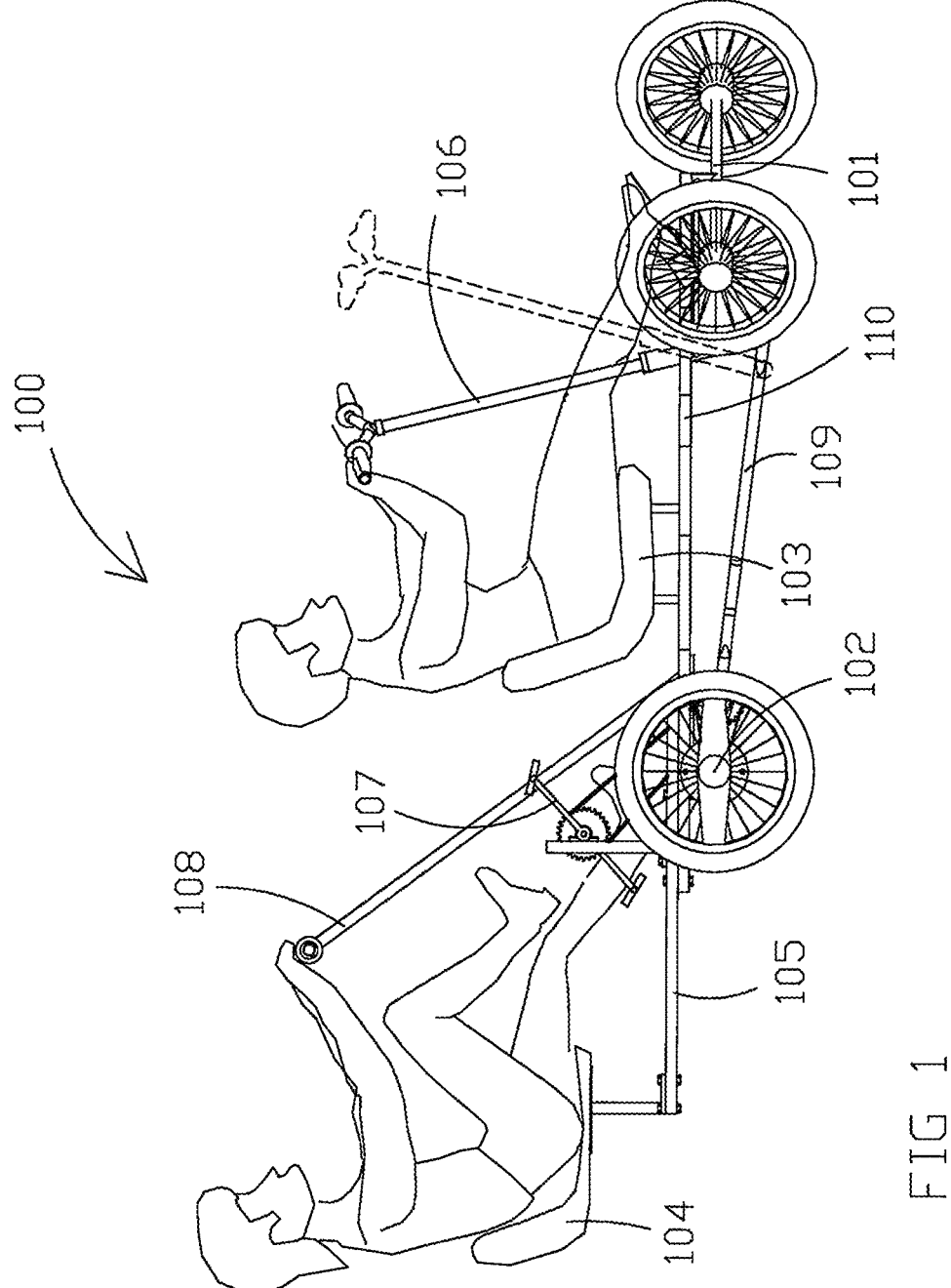
FIG. 1 is a side view of the multiple seat wagon 100 of claim 1.

While the specification concludes with claims defining the features of the invention regarded as novel, it is believed that the invention will be better understood with the following description with the drawing figures, in which like reference numerals are carried forward. The disclosed embodiments are merely exemplary of the invention, which can be embodied in various forms.

The present invention provides a novel multiple-seat wagon propelled by simultaneously rowing and pedaling, 100. Embodiments of the invention provide the permeable herbal container 100 to include a cap to seal the herbs inside. Embodiments of the invention provide a way to couple different chassis. Referring now to FIG. 1, one embodiment of the present invention is in a side view. FIG. 1 shows several advantageous features of the present invention, but, the invention can be provided in several shapes, sizes, combinations of features and components, and varying numbers and functions of the components.

The first example of a multiple-seat wagon 100, as shown in FIG. 1, is a multiple-seat wagon 100 that includes front chassis part 110, a back chassis part 105, a front axle 101, and a rear axle 102. The multiple-seat wagon 100 is propelled with a rowing assembly 106 and pedaling assembly 107. The rowing assembly 106 transfers power to the pedaling assembly 107 with a transfer bar 109. The pedaling person holds on to the wagon using a non-moving T-bar 108. In one embodiment of the invention, the multiple-seat wagon 100 herein comprises a couple of seats 105 and 103. More than two-seat wagon embodiments have been considered by the inventor as equivalent.

Figure 2:
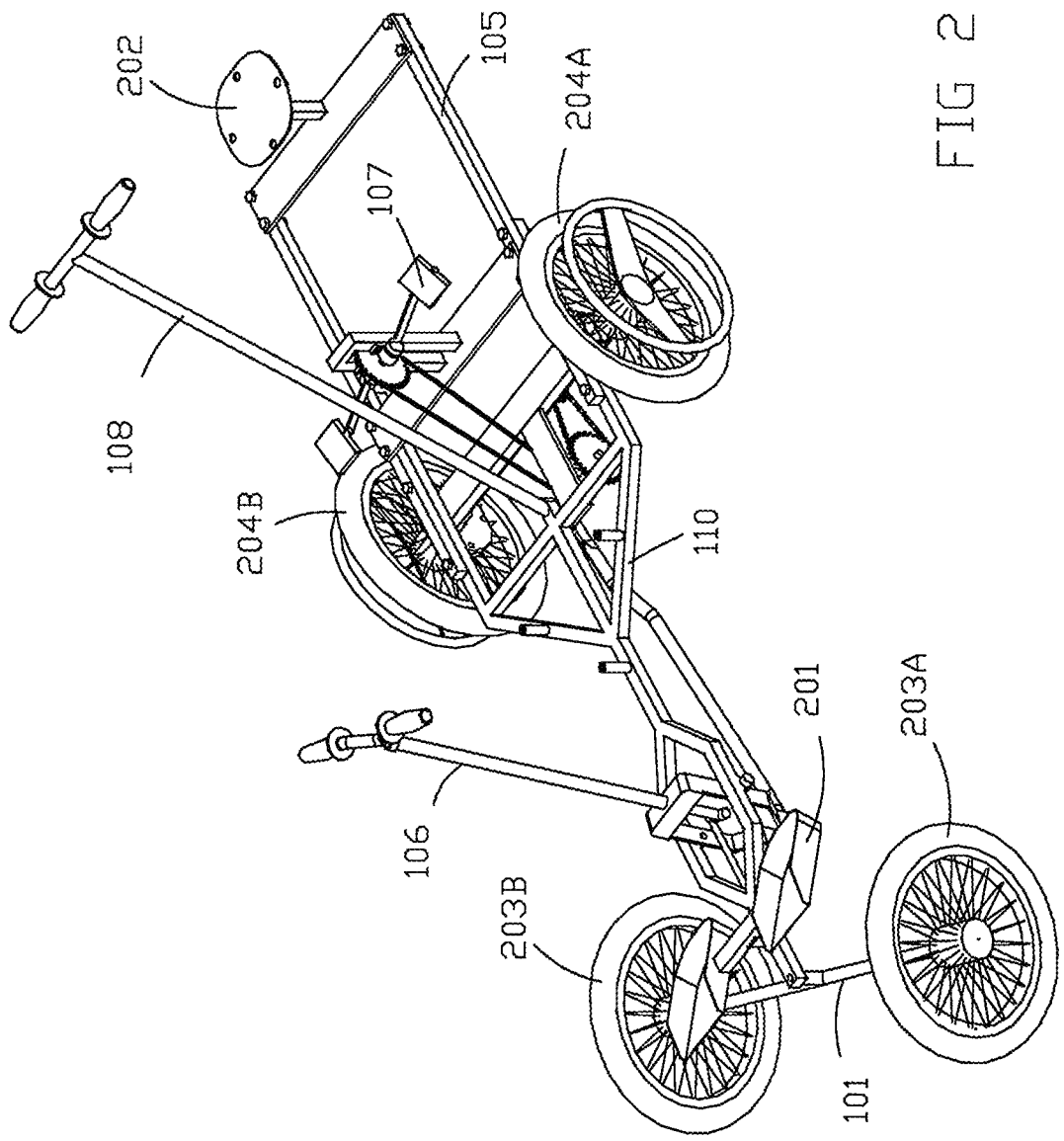
FIG. 2 is a perspective view of FIG. 1 multiple seat wagon 100 depicting a first rowing 106 and pedaling 107 body assembly 105 and 110 defining a first chassis 500 assembly at an upper portion.

A more detailed view of the functionality of the multiple-seat wagon 100 is now depicted in FIG. 2. FIG. 2 is a downward perspective view of the multiple-seat wagon previously depicted in FIG. 1 100. As previously seen in FIG. 1, the multiple-seat wagon 100 includes a front chassis part 110, a back chassis part 105 with wheels 204 A and 204 B, a front axle and a rear axle 102, and a front foot holders 201. The multiple-seat wagon 100 is propelled with a rowing assembly 106 and pedaling assembly 107. The rowing assembly 106 transfers power to the pedaling assembly 107 with a transfer bar 109. The multiple-seat wagon 100 herein comprises a rear seat plate 202 where the seat or cushions are mounted.

Front Chassis Part 110: The front chassis 110 part provides structural support for the wagon and connects to the other components of the vehicle. It plays a crucial role in maintaining the wagon's stability and functionality. Back Chassis Part 105: This part 105 contains the wheels (204 A and 204 B) of the wagon, which allow it to move. The back chassis part is responsible for providing support to the rear of the wagon and connecting the wheels to the chassis. Front Axle 101 and Rear Axle 102: These axles are crucial for the suspension and steering of the multiple-seat wagon. They allow the front and rear wheels to pivot and steer, ensuring better control and maneuverability. Front Foot Holders 201: The front foot holders 201 are likely a part of the wagon designed for passengers to place their feet while riding. They provide a place for passengers to rest their feet comfortably. Rowing Assembly 106: The rowing assembly 106 is a feature that allows passengers to generate forward motion by simulating rowing actions. It may consist of handles or levers that passengers can use to row, contributing to the wagon's propulsion. Pedaling Assembly 107: The pedaling assembly 107 is another method of generating motion for the wagon. Passengers can pedal, much like on a bicycle, to contribute to the vehicle's movement. Transfer Bar 109: The transfer bar 109 is a component that connects the rowing assembly 106 and the pedaling assembly 107. It likely transfers the power generated from rowing to the pedaling mechanism, ensuring that both methods of propulsion work in tandem. Rear Seat Plate 202: The rear seat plate 202 provides seating for passengers in the rear of the wagon, allowing them to sit comfortably while the wagon is in motion.

Figure 3:
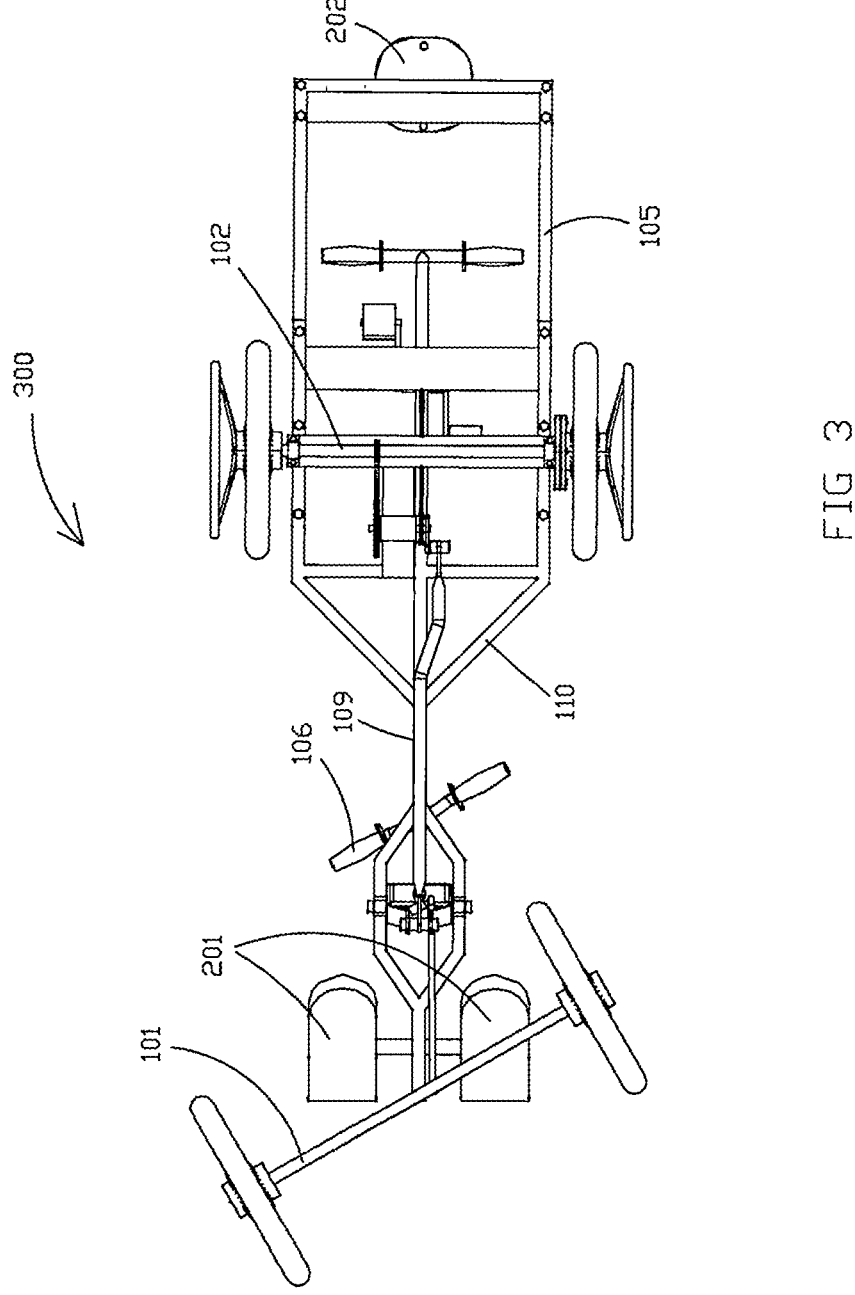
FIG. 3 is a bottom view if FIG. 1 and FIG. 2, namely multiple seat wagon 100 depicting a first rowing 106 and pedaling 107 body assembly 105 and 110 defining a first chassis 500 assembly at an upper portion.

Another more detailed view of the functionality of the multiple-seat wagon 100 is now depicted in FIG. 3. FIG. 3 is a bottom view of the multiple-seat wagon previously depicted in FIG. 1 100 and FIG. 2. As previously seen in FIG. 1-2, the multiple-seat wagon 100 includes a front chassis part 110, a back chassis part 105 with wheels 204 A and 204 B, a front axle 101 with wheels 203 A and 203 B, and a front foot holder 201. The multiple-seat wagon 100 is propelled with a rowing assembly 106 and a pedaling assembly 107. The rowing assembly 106 transfers power to the pedaling assembly 107 with a transfer bar 109.

Figure 4:
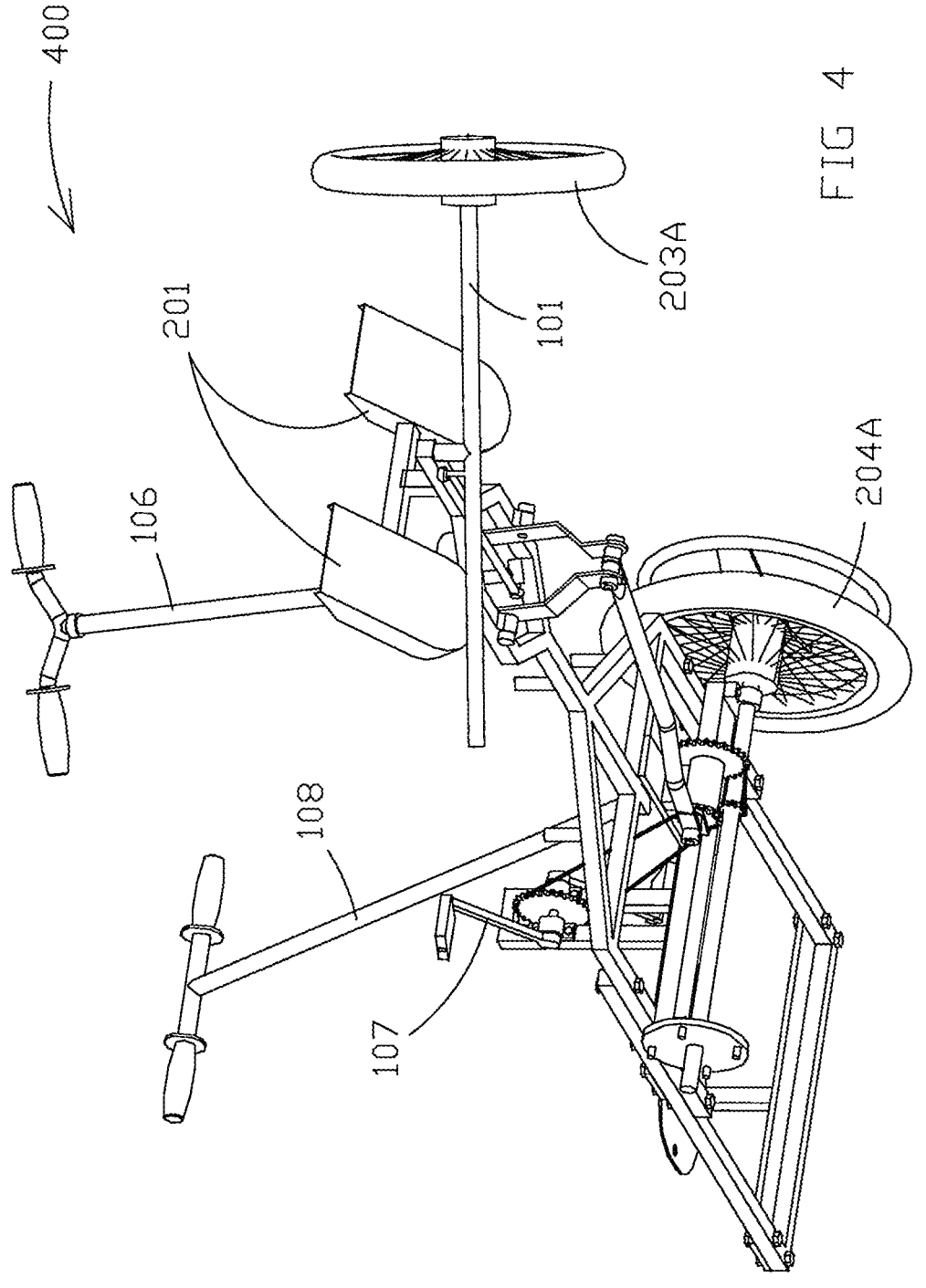
FIG. 4 is an upward perspective view of FIG. 1 multiple seat wagon 100 depicting a first rowing 106 and pedaling 107 body assembly 105 and 110 defining a first chassis 500 assembly at an upper portion with the left wheels dismounted.

An exploited view of the multiple-seat wagon 400 is now depicted in FIG. 4. FIG. 4 is an orthogonal view of the multiple-seat wagon previously depicted in FIG. 1-3 and 100. As previously seen in FIG. 1-3, the multiple-seat wagon 100 includes a front chassis part 110, a back chassis part 105 with wheels 204 A and 204 B here dismounted and not shown, a front axle 101 with wheels 203 A and 203 B here dismounted and not shown, and a front foot holder 201. The pedaling person holds on to the wagon using a non-moving T-bar 108. The multiple-seat wagon 100 is propelled with a rowing assembly 106 and a pedaling assembly 107. The rowing assembly 106 transfers power to the pedaling assembly 107 with a transfer bar 109.

Figure 5:
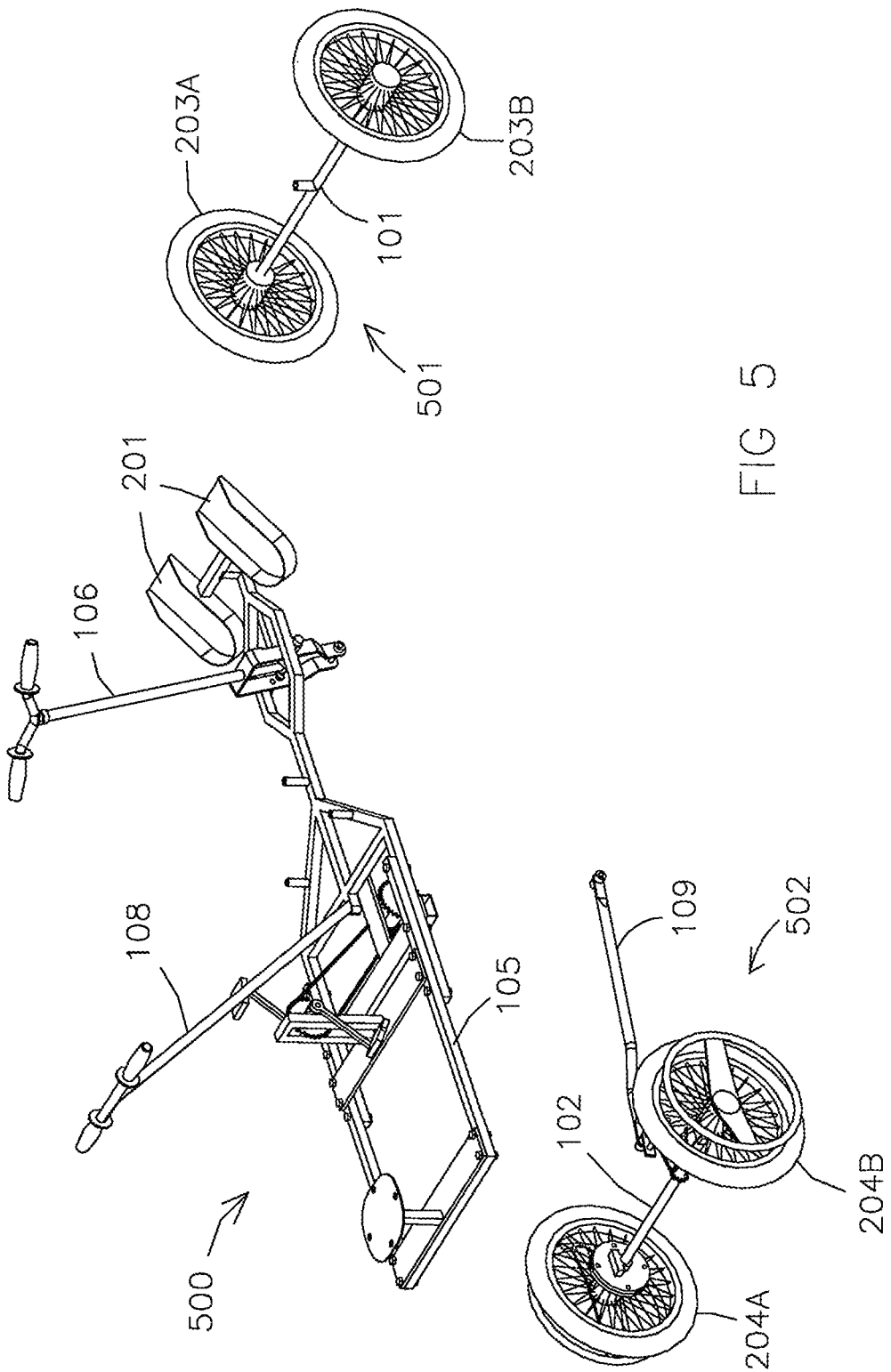
FIG. 5 is a perspective view of FIG. 1, a first rowing 106 and pedaling 107 body assembly 105 and 110 defining a first chassis 500 assembly at an upper portion with the removable front axle 101 with two wheels and the removable back axle 102 with two wheels dismounted.

In this embodiment in FIG. 5, an exploited view of the first chassis 500 of the multiple-seat wagon was previously shown as 400. FIG. 5 is an orthogonal view of the multiple-seat wagon with the front foot holder 201 where the rowing person sitting at the front places their feet. The pedaling person in the back holds on to the wagon using a non-moving T-bar 108. The front chassis part 110, a back chassis part 105 with wheels 204 A and 204 B here dismounted, a front axle 101 with wheels 203 A and 203 B here dismounted.

Figure 6:
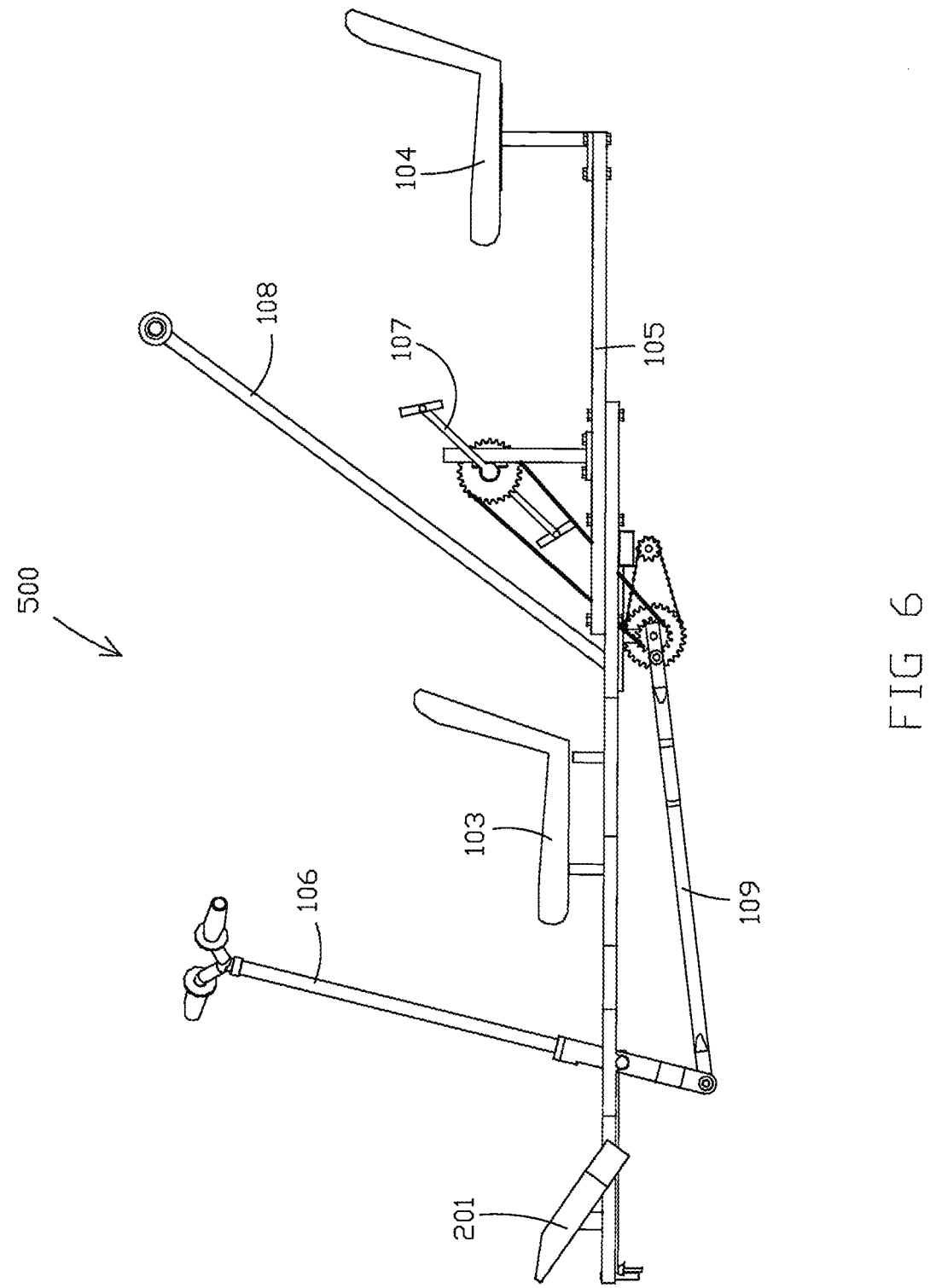
FIG. 6 is a side view of the first rowing 106 and pedaling 107 body assembly 105 and 110, defining a first chassis 500 assembly.

The embodiment in FIG. 6 is a side view of the multiple-seat wagon defining a first chassis 500 assembly at an upper portion. At the front, the rowing person sitting on seat 103 places their feet on foot holder 201. The pedaling person in the back sits on seat 104 and holds on to the wagon using a non-moving T-bar 108. The rowing assembly 106 transfers power to the pedaling assembly 107 with a transfer bar 109.

The first chassis 500 assembly material comprises could be made from a variety of materials, each with its own set of characteristics, advantages, and disadvantages. Here are some common materials used for first chassis 500 assembly and the following embodiments have been considered by the inventor as equivalent:

Steel: Steel is the traditional material for frames and is used in many chassis. It can be heavy compared to some other materials, but it offers a smooth and comfortable ride due to its dampening properties. Steel frames can also be very durable and repairable. Different types of steel, such as chromoly and high-tensile steel, are used in chassis construction.

Aluminum: Aluminum is a lightweight and corrosion-resistant material commonly used in chassis assembly. It provides a good balance of strength and weight, making it a good choice. Aluminum frames can be stiff, which can contribute to efficient power transfer, but they may not absorb vibrations as well as steel or carbon fiber.

Carbon Fiber: Carbon fiber is a high-performance material known for its lightweight and stiffness. It can be molded into various shapes, allowing for aerodynamic and innovative frame designs. They offer excellent vibration damping and can be tailored for specific characteristics. However, they can be more expensive and less durable than steel or aluminum.

Titanium: Titanium frames offer a unique combination of properties, including excellent strength-to-weight ratio, corrosion resistance, and a comfortable ride quality. They are often chosen by riders who want a high-quality frame with some of the benefits of both steel and aluminum.

Other Materials: Some less common frame materials include bamboo, which provides a unique and sustainable option, and various experimental materials like magnesium or advanced composites.

It's important to note that many first chassis 500 assembly are not made entirely from a single material. An embodiment uses a combination of materials to optimize various chassis characteristics. For instance, a chassis might have an aluminum or carbon front triangle for stiffness and a steel or carbon rear triangle for compliance and comfort. The choice of material can significantly impact a chassis performance.

Figure 7:
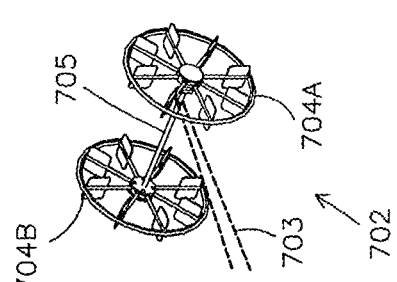
FIG. 7 is a downward perspective view of the unassembled parts of the multiple-seat wagon propelled by simultaneously rowing and pedaling.
Figure 7:
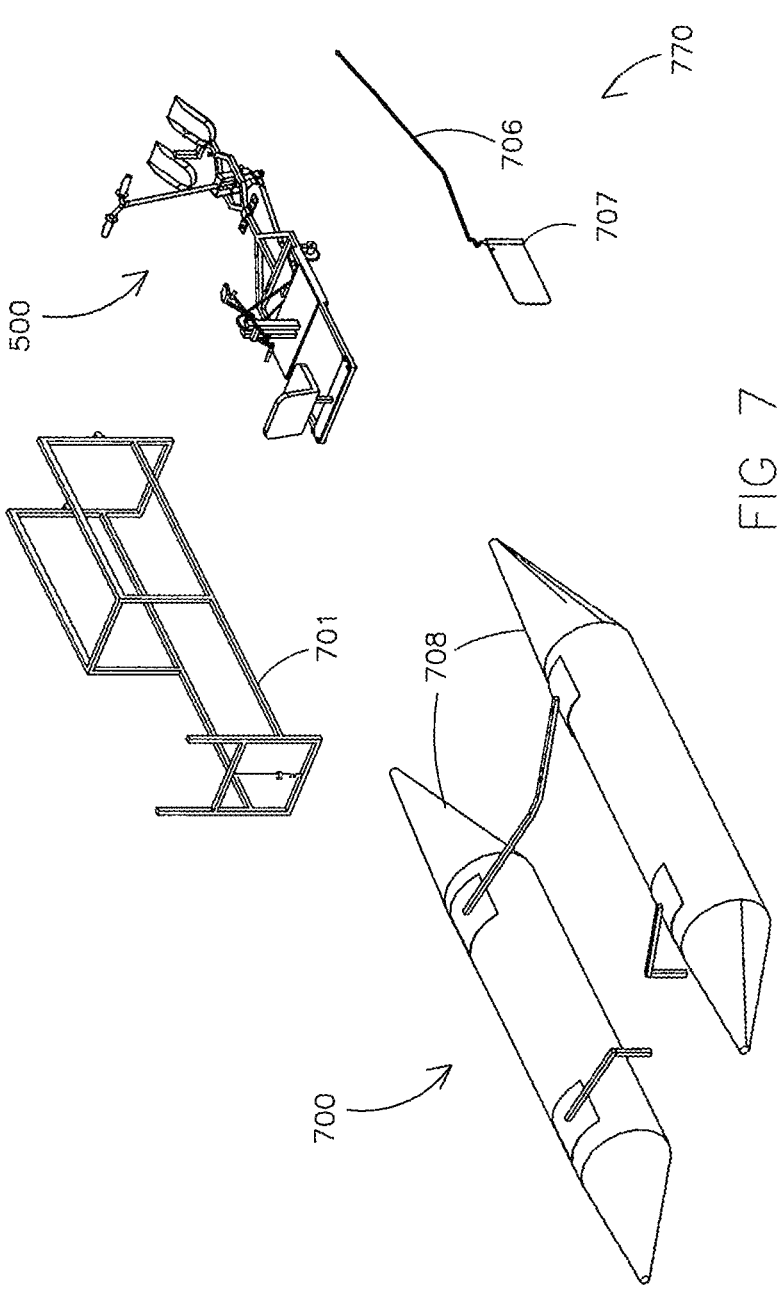

FIG. 7 is a top orthogonal overview of the assembly components that together make the multiple-seat wagon 100 propelled by simultaneously rowing and pedaling for use in water or land. This includes the floating assembly 700, the second chassis assembly 701 at a lower portion, the first chassis 500 assembly at an upper portion, the water steering assembly 770, and the water propulsion assembly 702. This includes the floating assembly 700, which further includes floating buoys 708.

Figure 8:
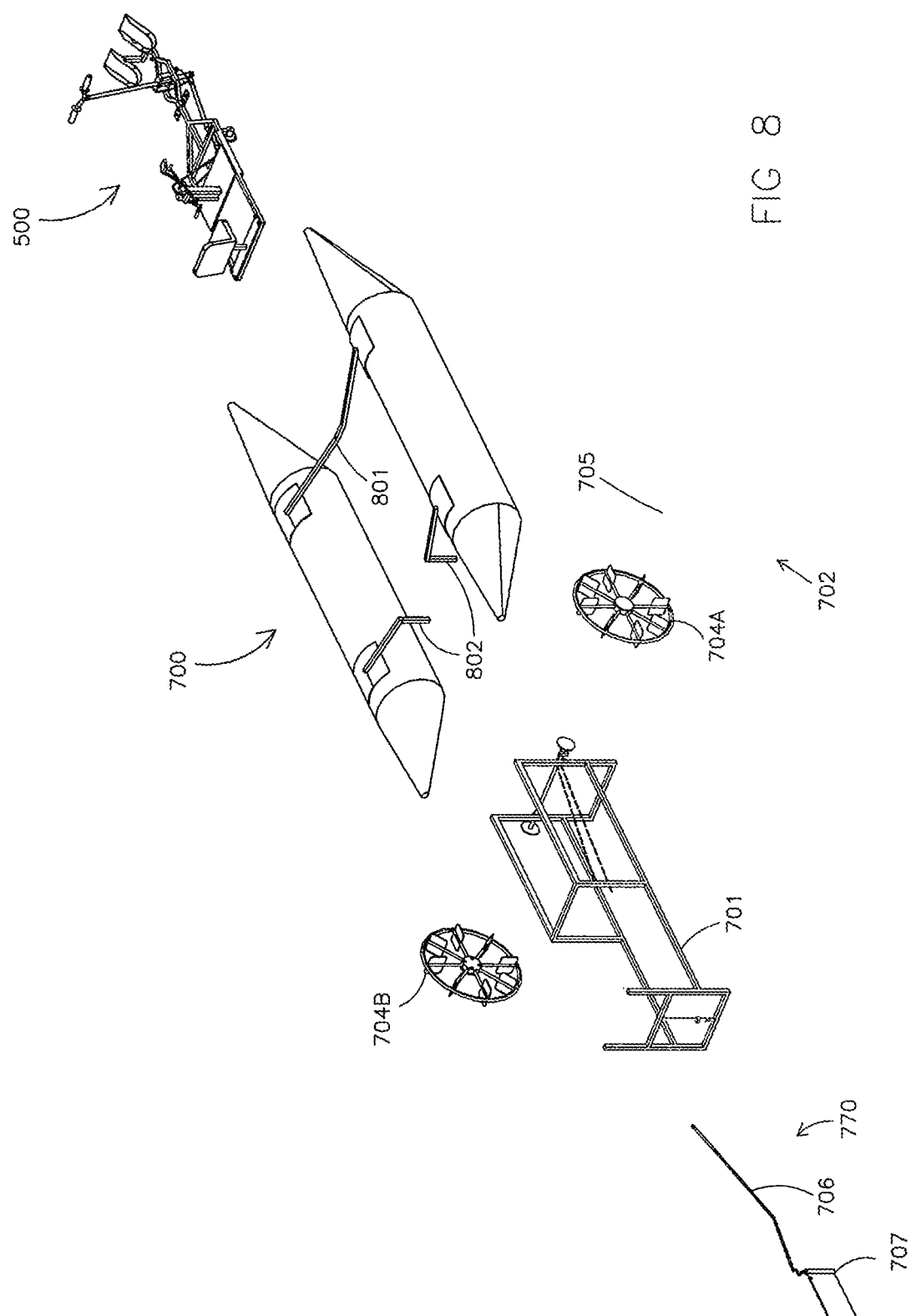
FIG. 8 is a downward perspective view of floating assembly 700 defining a second chassis assembly 701 at a lower portion and a first rowing 106 and pedaling 107 body assembly 105 and 110 defining a first chassis 500 assembly at an upper portion.
Figure 9:
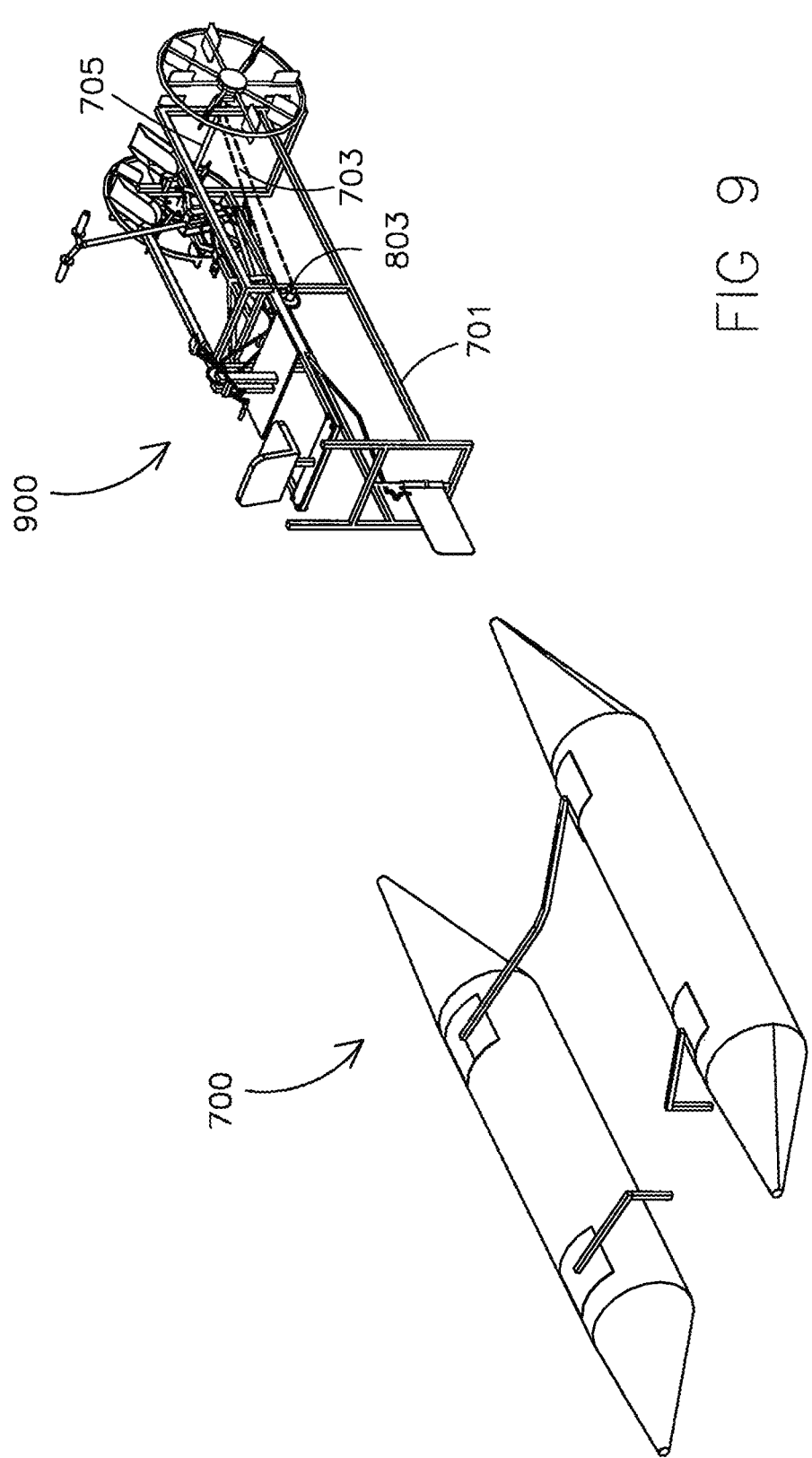
FIG. 9 is a downward perspective view of assembly step one, depicting floating assembly 700 on the left and the second chassis assembly 701 at a lower portion coupling with the first chassis 500 assembly at an upper portion.

FIG. 8 is a top orthogonal overview of how the multiple-seat wagon 100 is getting ready for assembly into a sea vessel. Here, the first chassis 500 assembly is placed at an upper portion, then the floating assembly 700 is placed on top of the second chassis 701 assembly at a lower portion, placing the water propulsion assembly 702, which includes two water wheels 704 A and 704 B. floating assembly 700 is placed demountable coupled with the second chassis 701 assembly at a lower portion using mount brackets 802 and crossbar 801. Here, the water steering assembly 770 is shown as it comprises a rudder 707 and a tiller 706. The pinion gear 803 is placed separately, as shown in FIG. 9. The term, "demountable coupled" suggests a system or structure that can be taken apart and reassembled while maintaining some form of interconnection or coupling between its components.

FIG. 9 is a top orthogonal overview of how the multiple-seat wagon 100 shows the next step in assembly as it is getting ready to be converted into a sea vessel. Here, the first chassis assembly at an upper portion has been coupled with the second chassis assembly 701 at a lower portion along with the water steering assembly previously shown in detail in FIG. 7. The water propulsion assembly is also added using a water shaft 705 which holds the two water wheels previously shown as 704 A and 704 B. To create propulsion from the pedaling body assembly and the two water wheels, a chain link 703 is coupled with pinion gear 803. The floating assembly 700 is placed on the bottom, and here is shown as it is ready for further assembly.

Figure 10:
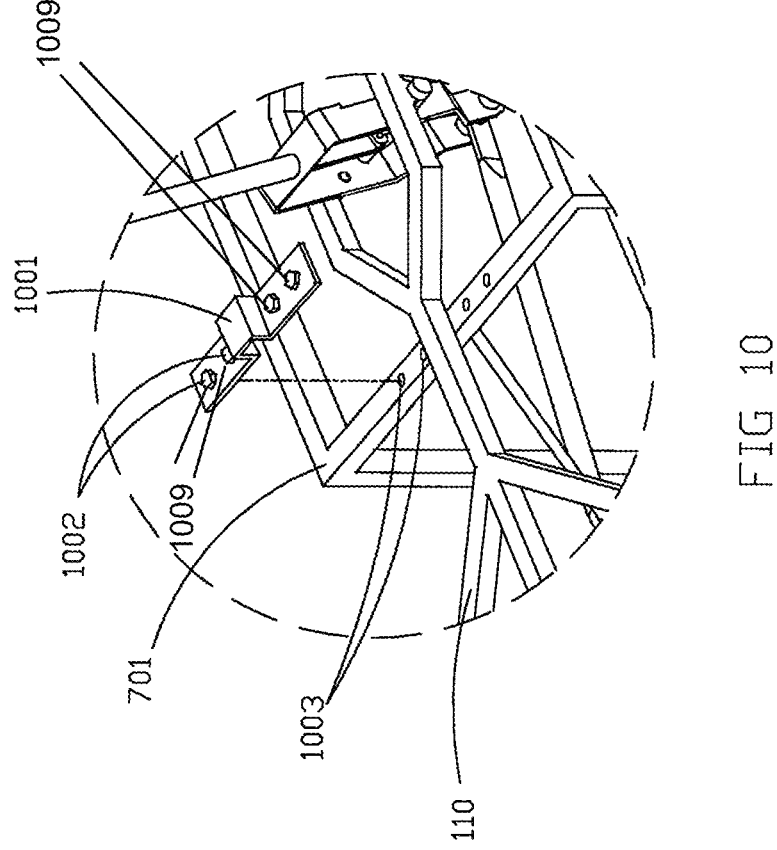
FIG. 10 is a detailed view of the coupling mechanism showing the details of the first chassis assembly at an upper portion demonstrably couples with the second chassis assembly at a lower portion by a mounting plate 1001.

FIG. 10 is a detailed view of the coupling mechanism between the different chassis assemblies previously shown. Here, the first rowing and pedaling body assembly 110 couples with the second water buoyant assembly 701 using a first set of apertures 1002, a plurality of interlocking grooves 1001, and a second set of apertures 1003 and a plurality of interlocking grooves sized to mate the first chassis assembly. In another embodiment, a mounting plate 1001 is used to fasten the two chassis assemblies. The types of fasteners used for joining and securing the aforementioned chassis assemblies together, as used by the inventor or someone skilled in the art, are the following: Bolt: A threaded fastener with a head that is used with a nut to join two or more parts together. Screw: Similar to a bolt but designed to be used without a nut, often used for threading into a material to create a secure connection Nut: A type of fastener used in conjunction with a bolt to secure two or more parts by threading onto the bolt. Washer: A flat, thin disk used with bolts and nuts to distribute the load and prevent damage to the material being fastened. Stud: A threaded rod without a head, used for threaded connections in machinery and construction. Rivet: A permanent fastener that is inserted through holes and then deformed to hold components together. Pin: A cylindrical fastener used to hold parts in a specific position. Cotter Pin: A pin with split ends that can be bent to secure parts in place, often used in machinery. Clamp: A fastener used to hold parts together by applying pressure, commonly used in woodworking and metalworking. Anchor Bolt: A heavy-duty bolt used to secure heavy objects to a solid surface like concrete. Spring Clip: A type of fastener with spring-loaded jaws used for securing items together. Clips and Clamps: Various specialized clips and clamps designed for specific applications, such as hose clamps, paper clips, and binder clips.

Figure 11:
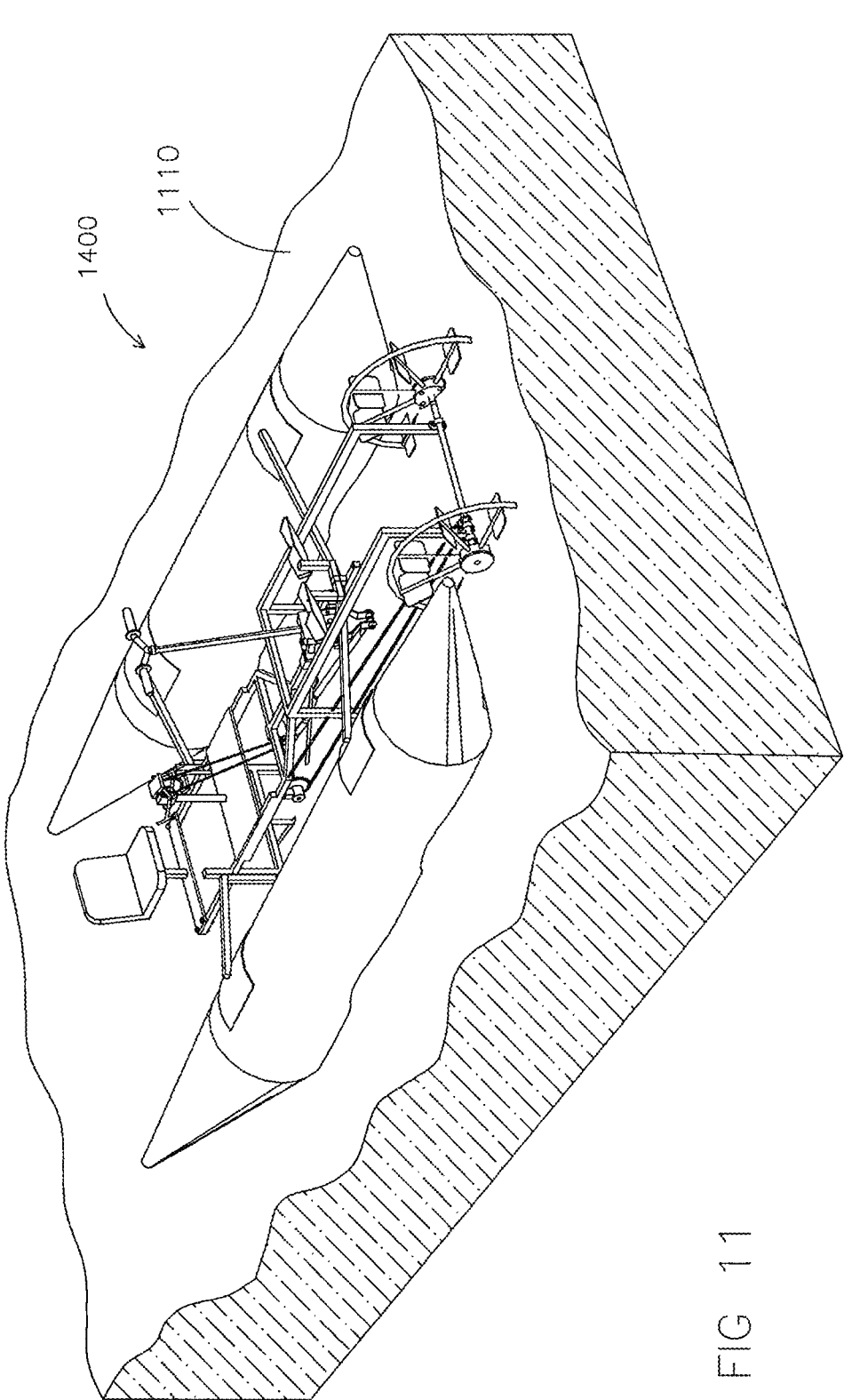
FIG. 11 is a downward perspective view of the fully assembled parts of the multiple-seat wagon propelled by simultaneously rowing and pedaling, depicting floating assembly 700 and the second chassis assembly 701 at a lower portion coupling with the first chassis 500 assembly at an upper portion as it is placed on water 1110.

FIG. 11 shows a top orthogonal view of the multiple-seat wagon propelled by simultaneously rowing and pedaling for use in water or land 1400 as it is fully assembled and floating on water 1110. Having a multiple-seat wagon propelled by simultaneously rowing and pedaling that can operate both on land and on water can offer several unique benefits, making it a versatile and practical mode of transportation. Here are some advantages of such a dual-purpose multiple-seat wagon propelled by simultaneously rowing and pedaling:

Enhanced Mobility: A multiple-seat wagon propelled by simultaneously rowing and pedaling that works on land and water provides greater mobility and freedom of movement. You can seamlessly transition between different terrains without the need to switch vehicles, saving time and effort. Eco-Friendly Transportation: multiple-seat wagon propelled by simultaneously rowing and pedaling are already known for their eco-friendliness as they produce no emissions. A water-capable multiple-seat wagon propelled by simultaneously rowing and pedaling enhances this aspect, as it allows you to avoid using motorized boats or jet skis for water travel, reducing your carbon footprint. Cost Savings: Operating a dual-purpose multiple-seat wagon propelled by simultaneously rowing and pedaling can be cost-effective. You won't need to invest in multiple vehicles for land and water transportation. This can lead to savings on vehicle purchase, maintenance, and fuel costs. Exploration: Such a multiple-seat wagon propelled by simultaneously rowing and pedaling can facilitate the exploration of diverse landscapes and environments. You can easily transition from cycling on roads or trails to traversing lakes, rivers, or other bodies of water, opening up new opportunities for adventure and discovery.

Other advantages include Improved Accessibility: In regions with limited road infrastructure but abundant waterways, a water-capable multiple-seat wagon propelled by simultaneously rowing and pedaling can provide better access to remote areas and islands where traditional vehicles might not be practical. Fitness and Health: rowing and pedaling is a great form of exercise, and the need to pedal on both land and water can provide a full-body workout. This promotes physical fitness and overall well-being. Versatility: These multiple-seat wagon propelled by simultaneously rowing and pedaling can serve various purposes, from leisurely rides and commuting to water-based activities like fishing or touring. They can be adapted to a wide range of recreational and practical uses. Reduced Traffic Congestion: In urban areas near water bodies, water-capable multiple-seat wagon propelled by simultaneously rowing and pedaling can offer a unique solution to alleviate road congestion by allowing commuters to bypass traffic by crossing waterways. Adaptability to Flooding and Wet Conditions: In flood-prone regions or areas with frequent wet conditions, water-capable multiple-seat wagon propelled by simultaneously rowing and pedaling can remain functional even when the roads are submerged or impassable due to high water levels. Resilience and Emergency Use: In disaster-prone regions, a multiple-seat wagon propelled by simultaneously rowing and pedaling that operates on both land and water can be a valuable tool for emergency response, allowing individuals to quickly move across different terrains to reach affected areas or evacuate when necessary.

Figure 12:
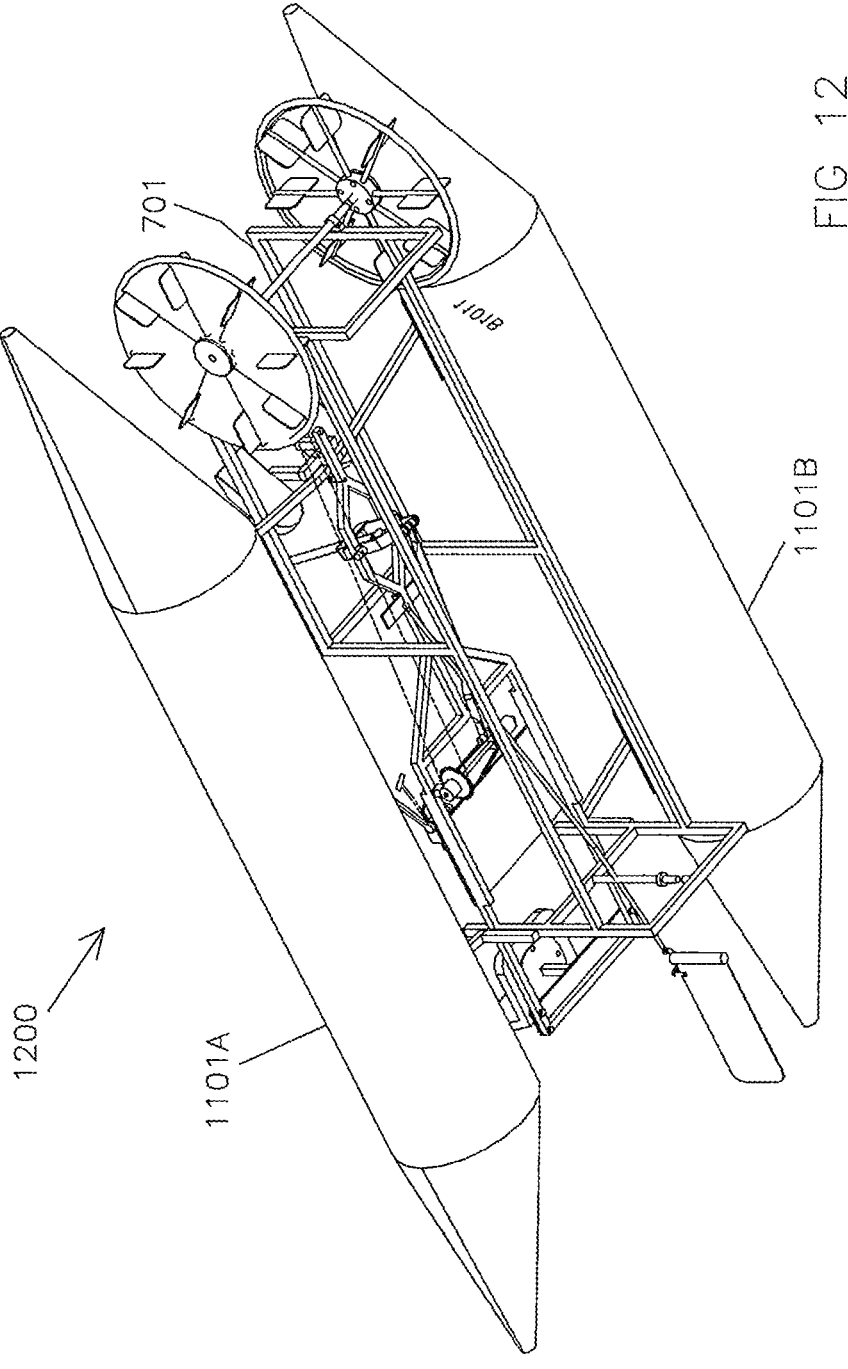
FIG. 12 is a perspective view of the fully assembled parts of the multiple-seat wagon propelled by simultaneously rowing and pedaling, depicting floating assembly 700 and the second chassis assembly 701 at a lower portion coupling with the first chassis 500 assembly at an upper portion.

FIG. 12 shows a bottom orthogonal view of the multiple-seat wagon propelled by simultaneously rowing and pedaling for use in water or land 1200 as it is fully assembled and floating on water 1110. The multiple-seat wagon being converted into a sea vessel, it's clear that the mechanical advantage in this context pertains to the ability of the water propulsion system to efficiently convert the rotational motion produced by the pedaling body assembly into the desired propulsion for the vessel.

Figure 13:
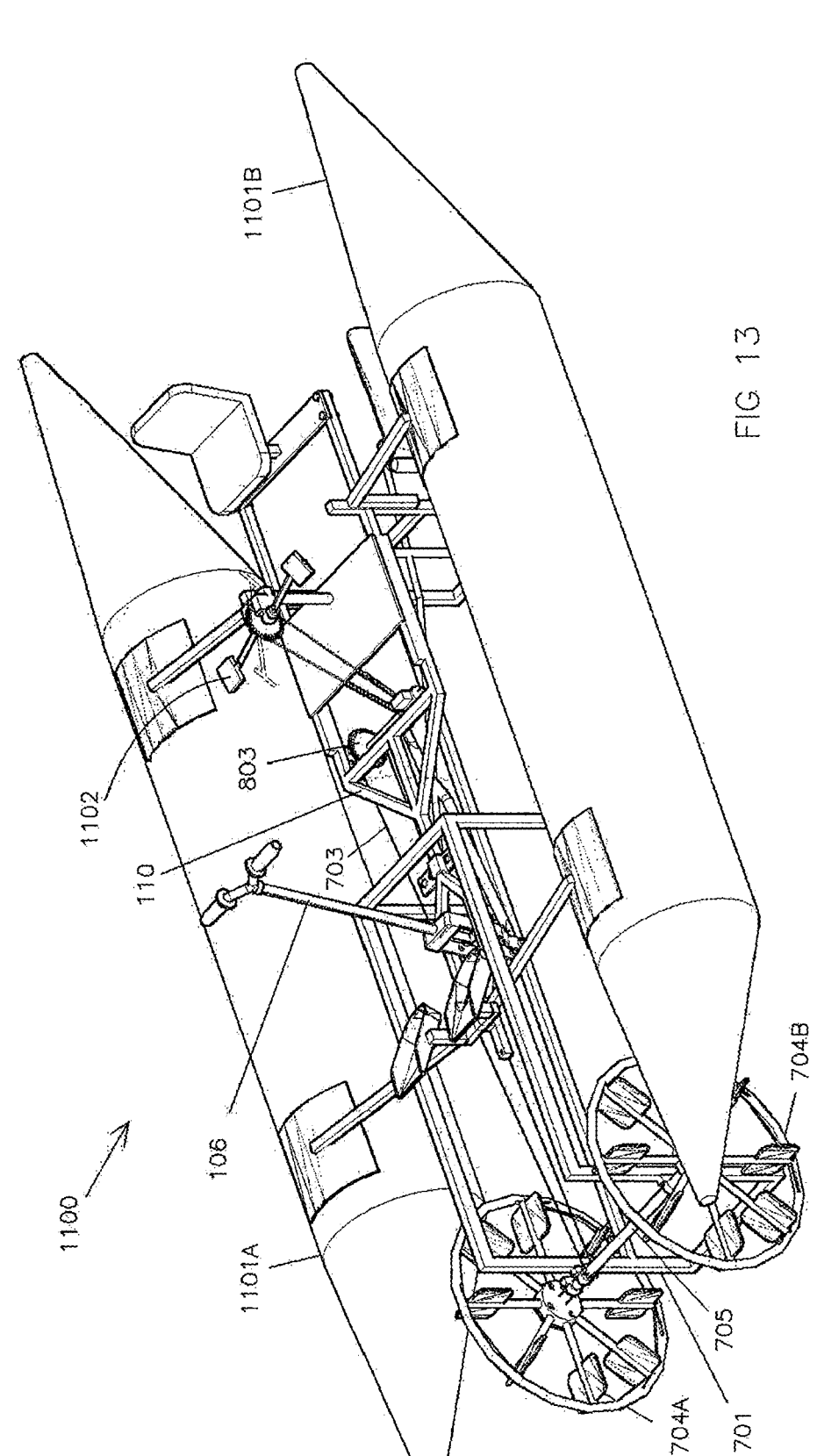
FIG. 13 shows a perspective view of the multiple-seat wagon propelled by simultaneously rowing and pedaling for use in water or land 1100 as it is fully assembled.

FIG. 13 shows a top orthogonal view of the multiple-seat wagon propelled by simultaneously rowing and pedaling for use in water or land 1100 as it is fully assembled. This novel invention includes all the parts and elements previously described in FIGS. 1-10. A first rowing 106 and pedaling 107 body assembly 105 and 110 defining a first chassis 500 assembly at an upper portion and a floating assembly 700 defining a second chassis assembly 701 at a lower portion. On the lower portion, the water propulsion assembly 702, which includes two water wheels, 704 A and 704 B, is seen here at the front of the vessel. The pair of floating buoys 1101A and 1101B demountable couples with the second chassis 701 assemblies at a lower portion is shown on both sides of the first chassis 500 and second chassis assembly 701. The first rowing 106 is shown in the middle, and the pedaling assembly 1102 (without the pedals) is shown in the back.

Figure 14:
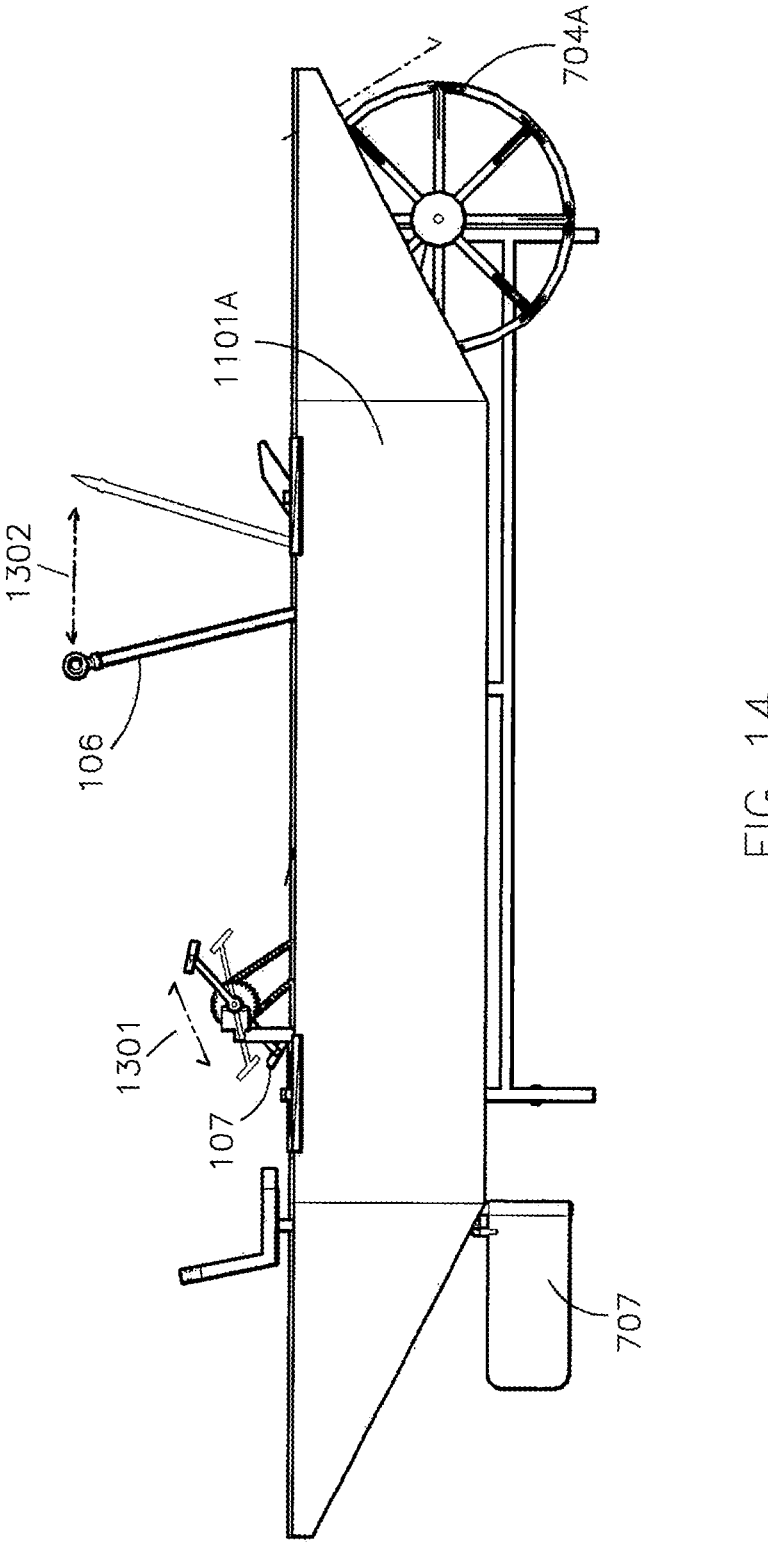
FIG. 14 is a side view of view of the fully assembled parts of the multiple-seat wagon propelled by simultaneously rowing and pedaling, depicting floating assembly 700 and the second chassis assembly 701 at a lower portion coupling with the first chassis 500 assembly at an upper portion and the water wheels (704 A and 704 B).

FIG. 14 is a side view of the water propulsion assembly 702, which includes two water wheels (704 A and 704 B), which are components responsible for generating forward motion in the water. The chain link 703 connects the output of the pedaling 1301 body assembly 107 to a pinion gear 803 on the water propulsion assembly. As the chain link rotates due to pedaling motion 1301 and rowing motion 1302, it turns the pinion gear, which is part of the water propulsion assembly. The pinion gear 803 is a gear with a small radius, and it meshes with another gear, likely on one of the water wheels 704. This gear arrangement provides a mechanical advantage because it increases the rotational speed of the larger water wheels (704 A and 704 B), thereby translating the pedaling motion 1301 and rowing motion 1302 into a more efficient and powerful rotation for propelling the floating buoys 1101A through the water. The water wheels (704 A and 704 B) are larger wheels or paddles that, when rotated by the pinion gear, create a propulsive force in the water and are maneuverable using rudder 707. The larger the diameter of the water wheels (704 A and 704 B), the more efficient they are at displacing water and providing forward motion.

The mechanical advantage of pedaling motion 1301 and rowing motion 1302 in this invention can be understood as follows: The pedaling and rowing body assembly provides an input force, and the chain link transmits this rotational motion to the pinion gear. The pinion gear, being smaller in diameter, increases the rotational speed, which can be translated into greater rotational speed and efficiency in the larger water wheels. The larger water wheels (704 A and 704 B), with their increased diameter and greater surface area, can displace more water with each rotation, creating a more powerful and efficient propulsion system for the sea vessel. This system maximizes the input force provided by the pedaling and rowing assembly and converts it into a mechanical advantage in the form of increased rotational speed and efficiency for the water wheels. This enhanced mechanical advantage allows the vessel to move more efficiently through the water with less effort from the passengers, making it a more effective means of water transportation.

Figure 15:
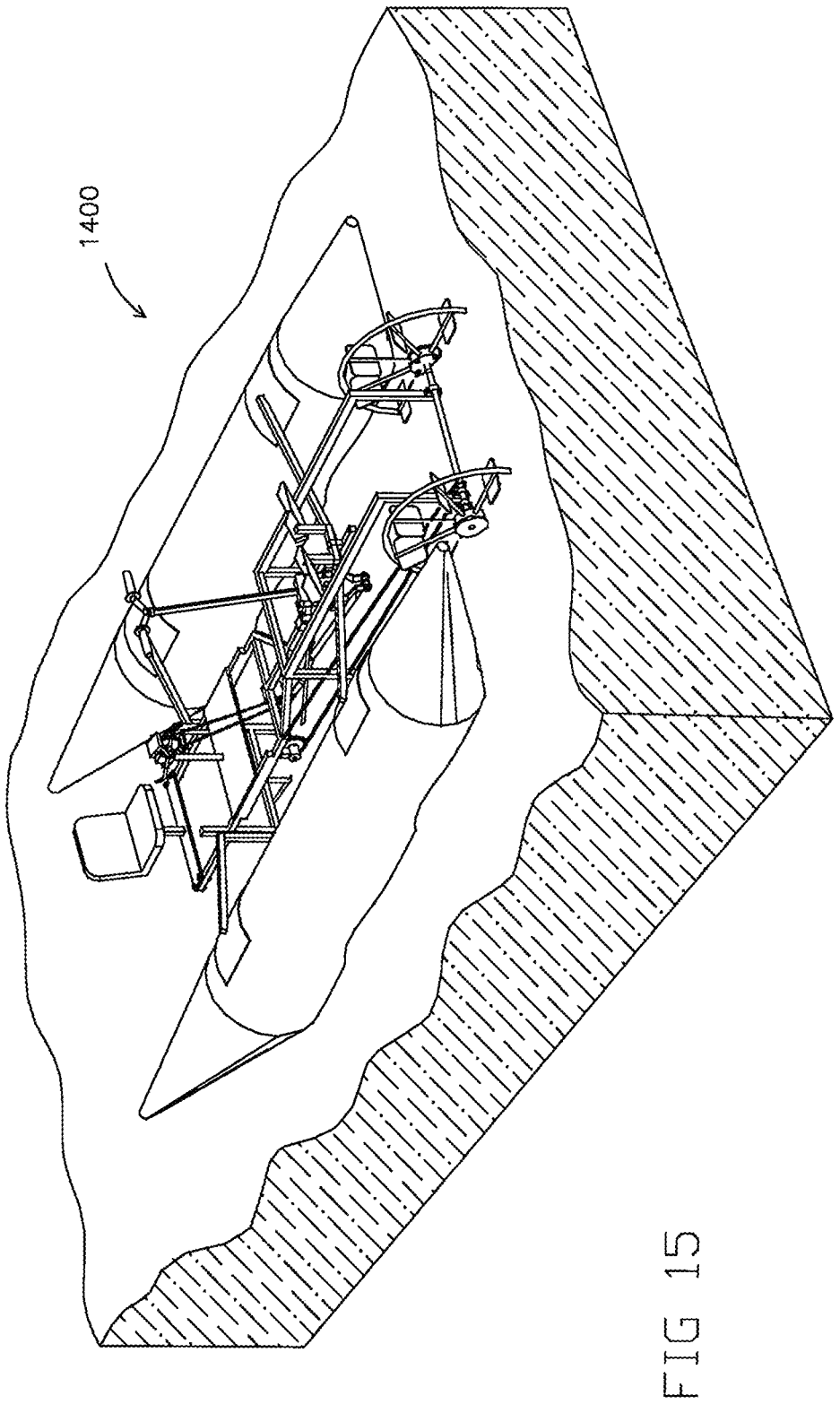
FIG. 15 is a top perspective view of the fully assembled multiple-seat wagon propelled by simultaneously rowing and pedaling, depicting floating assembly on water.

FIG. 15 shows another orthogonal view of the multiple-seat wagon propelled by simultaneously rowing and pedaling for use in water or land 1400 as it is fully assembled and floating on water. It's worth noting that such dual-purpose multiple-seat wagons propelled by simultaneously rowing and pedaling 1400 often come in various designs, including amphibious water bikes, which are engineered to function both on land and in water. While they offer numerous benefits, they may also have limitations, such as speed, range, and handling characteristics, that should be considered when using them in specific scenarios.

A dual-purpose multiple-seat wagon propelled by simultaneously rowing and pedaling has been disclosed in several embodiments. The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are within the meaning and range of equivalents of the disclosed embodiments, based on the teaching and guidance presented herein. The phraseology or terminology is for description and not of limitation, such that the terminology or phraseology of the present specification is interpreted by the skilled artisan in light of the teachings and guidance. The breadth and scope of the present invention should not be limited by the above-described exemplary embodiments but should be defined only under the following claims and their equivalents.

I claim:

1. A convertible vehicle for use in water or land comprising:
   a wheeled vehicle comprising a first chassis assembly, comprising a first seat with a corresponding pedal assembly, a second seat with a corresponding foot holder, a removable first axle with two wheels, a removable second axle with two wheels and a first set of apertures;
   and
   wherein the wheeled vehicle is configured for assembly into a sea vessel by removing the removable first axle with its two wheels and removing the removable second axle with its two wheels and attaching a floating assembly to the first chassis assembly, the floating assembly including a pair of floating buoys, and attaching a second chassis assembly to the first chassis assembly,
   the second chassis assembly including a second set of apertures, a plurality of interlocking bolts sized to mate with the first chassis assembly, and a water propulsion assembly including two water wheels.

2. The convertible vehicle of claim 1, wherein the first chassis assembly at an upper portion demountably couples with the second chassis assembly at a lower portion by a mounting plate.

\* \* \* \* \*